United States Patent
Honjo et al.

(10) Patent No.: US 10,188,980 B2
(45) Date of Patent: Jan. 29, 2019

(54) COAL UPGRADE PLANT AND METHOD FOR MANUFACTURING UPGRADED COAL

(71) Applicant: MITSUBISHI HEAVY INDUSTRIES, LTD., Tokyo (JP)

(72) Inventors: Shintaro Honjo, New York, NY (US); Kiyotaka Kunimune, New York, NY (US); Motofumi Ito, New York, NY (US); Junji Asahara, New York, NY (US)

(73) Assignee: MITSUBISHI HEAVY INDUSTRIES ENGINEERING, LTD., Yokohama-shi (JP)

(*) Notice: Subject to any disclaimer, the term of this patent is extended or adjusted under 35 U.S.C. 154(b) by 205 days.

(21) Appl. No.: 14/641,788

(22) Filed: Mar. 9, 2015

(65) Prior Publication Data

US 2016/0264869 A1 Sep. 15, 2016

(51) Int. Cl.
*C10L 9/08* (2006.01)
*B01D 53/18* (2006.01)
(Continued)

(52) U.S. Cl.
CPC ............ *B01D 53/18* (2013.01); *C02F 1/5272* (2013.01); *C02F 1/683* (2013.01); *C10B 53/04* (2013.01);
(Continued)

(58) Field of Classification Search
CPC ........ B01D 2252/103; B01D 2257/602; B01D 2258/0283; B01D 53/14; B01D 53/18; B01D 53/263; B01D 53/265; C02D 1/5272; C02F 1/683; C02F 2001/007; C02F 2101/20; C02F 2103/18; C10B 53/04;
(Continued)

(56) References Cited

U.S. PATENT DOCUMENTS 4,173,530 A 11/1979 Smith et al.
4,178,150 A 12/1979 Flockenhaus et al.
(Continued)

FOREIGN PATENT DOCUMENTS

AU 2013/300971 A1 2/2015
CN 103007614 A 4/2013
(Continued)

OTHER PUBLICATIONS

International Search Report dated Mar. 15, 2016, issued in application No. PCT/JP2016/053483, with English translation. (4 pages).
(Continued)

*Primary Examiner* — Latosha Hines
(74) *Attorney, Agent, or Firm* — Westerman, Hattori, Daniels & Adrian, LLP

(57) ABSTRACT

A coal upgrade plant includes: a dryer 1 that heats and dries coal before pyrolyzing the coal; a scrubber 32 that treats a carrier gas discharged from the dryer 1 while catching a desorbed component desorbed from the coal when the coal is dried by the dryer 1; a waste water treatment equipment 40 that treats waste water collected from the scrubber 32; and the scrubber 32 that uses recycled water treated in the waste water treatment equipment 40. Thus, water supplied to the coal upgrade plant from outside can be reduced as much as possible.

6 Claims, 2 Drawing Sheets

(51) Int. Cl.
| | | |
|---|---|---|
| *C02F 1/52* | (2006.01) | |
| *C02F 1/68* | (2006.01) | |
| *C10L 5/04* | (2006.01) | |
| *C10B 53/04* | (2006.01) | |
| *C10B 57/00* | (2006.01) | |
| *C10B 57/10* | (2006.01) | |
| *B01D 53/14* | (2006.01) | |
| *B01D 53/26* | (2006.01) | |
| *C02F 1/00* | (2006.01) | |
| *C02F 101/20* | (2006.01) | |
| *C02F 103/18* | (2006.01) | |

(52) U.S. Cl.
CPC ............ *C10B 57/005* (2013.01); *C10B 57/10* (2013.01); *C10L 5/04* (2013.01); *C10L 9/08* (2013.01); *B01D 53/14* (2013.01); *B01D 53/263* (2013.01); *B01D 53/265* (2013.01); *B01D 2252/103* (2013.01); *B01D 2257/602* (2013.01); *B01D 2258/0283* (2013.01); *C02F 2001/007* (2013.01); *C02F 2101/20* (2013.01); *C02F 2103/18* (2013.01); *C10L 2290/02* (2013.01); *C10L 2290/08* (2013.01); *C10L 2290/146* (2013.01); *C10L 2290/18* (2013.01); *C10L 2290/545* (2013.01)

(58) Field of Classification Search
CPC ... C10B 57/10; C10B 57/005; C10L 2290/08; C10L 5/04; C10L 9/02; C10L 9/08; C10L 2290/02; C10L 2290/18; C10L 2290/146; C10L 2290/545
USPC ................................................................ 1/1
See application file for complete search history.

(56) References Cited

U.S. PATENT DOCUMENTS

| | | | |
|---|---|---|---|
| 4,421,520 A | 12/1983 | Matthews | |
| 4,497,637 A | 2/1985 | Purdy et al. | |
| 4,602,438 A * | 7/1986 | Draper ...................... | C10F 5/00 34/172 |
| 4,705,533 A | 11/1987 | Simmons | |
| 4,725,337 A | 2/1988 | Greene | |
| 4,769,042 A | 9/1988 | Ito et al. | |
| 5,322,530 A | 6/1994 | Merriam et al. | |
| 5,423,891 A | 6/1995 | Taylor | |
| 5,711,769 A | 1/1998 | Rinker et al. | |
| 2011/0041393 A1 | 2/2011 | Sugita et al. | |
| 2014/0290130 A1* | 10/2014 | Supandi .................... | C10L 5/04 44/492 |
| 2014/0345193 A1 | 11/2014 | Nakagawa et al. | |
| 2015/0027872 A1 | 1/2015 | Abe et al. | |
| 2015/0175890 A1* | 6/2015 | Nakagawa ............ | C10B 57/005 202/136 |
| 2015/0329793 A1 | 11/2015 | Kaneko et al. | |
| 2016/0115100 A1* | 4/2016 | Glover .................... | C07C 7/005 585/802 |

FOREIGN PATENT DOCUMENTS

| | | | |
|---|---|---|---|
| JP | 56-52960 B2 | 12/1981 | |
| JP | 61-250098 A | 11/1986 | |
| JP | 62-114033 U | 7/1987 | |
| JP | 63-210192 A | 8/1988 | |
| JP | 9-71791 A | 3/1997 | |
| JP | 2005-105029 A | 4/2005 | |
| JP | 2006-96615 | 4/2006 | |
| JP | 2009-97783 A | 5/2009 | |
| JP | 2012-215316 A | 11/2012 | |
| JP | 2013-108700 A | 6/2013 | |
| JP | 2014-031462 A | 2/2014 | |
| JP | 2014031462 A * | 2/2014 | ........... C10B 57/005 |
| JP | 2015-30738 A | 2/2015 | |
| JP | 2015-110689 A | 6/2015 | |
| WO | 2013/103097 A1 | 7/2013 | |
| WO | 2013/125476 A1 | 8/2013 | |
| WO | 2014/024504 A1 | 2/2014 | |
| WO | 2014/091827 A1 | 6/2014 | |

OTHER PUBLICATIONS

Written Opinion dated Mar. 15, 2016, issued in application No. PCT/JP2016/0653483, with English Translation. (8 pages).
Internation Search Report dated May 10, 2016, issued in application No. PCT/JP2016/053486, with English translation. (4 pages).
Written Opinion dated Mar. 15, 2016, issued in application No. PCT/JP2016/053486, with English Translation. (6 pages).
International Search Report dated Mar. 15, 2016, issued in application No. PCT/JP2016/053488 with English translation. (2 pages).
Written Opinion dated Mar. 15, 2016, issued in application No. PCT/JP2016/053488, with English Translation. (6 pages).
International Search Report dated Mar. 15, 2016, issued in application No. PCT/JP2016/053482, with English translation. (4 pages).
Written Opinion dated Mar. 15, 2016, issued in application No. PCT/JP2016/053482, with English Translation. (6 pages).
International Search Report dated May 4, 2016, issued in application No. PCT/JP2016/053502, with English translation. (4 pages).
Written Opinion dated May 4, 2016, issued in application No. PCT/JP2016/053502, with English Translation. (8 pages).
Non-Final Office Action dated Jun. 30, 2016, issued in U.S. Appl. No. 14/641,780, (7 pages).
Non-Final Office Action dated Aug. 31, 2016, issued in U.S. Appl. No. 14/641,668, (8 pages).
American Electric Power, Wet Flue Gas Desulfurization, (Year: 2005).
Final Office Action dated Nov. 15, 2017, issued in U.S. Appl. No. 14/641,780. (11 pages).
Final Office Action dated Nov. 2, 2017, issued in U.S. Appl. No. 14/641,668. (9 pages).
Office Action dated Nov. 23, 2017, issued in Australian Application No. 2016230473. (5 pages).
Final Office Action dated Dec. 13, 2017, issued in U.S. Appl. No. 14/641,684. (12 pages).
Final Office Action dated Feb. 10, 2017, issued in U.S. Appl. No. 14/641,668. (7 pages).
Non-Final Office Action dated Dec. 9, 2016, issued in U.S. Appl. No. 14/641,801, (7 pages).
Final Office Action dated Dec. 30, 2016, issued in U.S. Appl. No. 14/641,780. (7 pages).
Non-Final Office Action dated Jun. 16, 2017, issued in related U.S. Appl. No. 14/641,780 (13 pages).
Final Office Action dated May 11, 2017, issued in related U.S. Appl. No. 14/641,801 (15 pages).
Non-Final Office Action dated May 23, 2017 issued in related U.S. Appl. No. 14/641,668 (10 pages).
Non-Final Office Action date Jul. 19, 2017, issued in related U.S. Appl. No. 14/641,684 (24 pages).
Office Action dated Jul. 10, 2018, issued in Japanese Application No. 2017-504916, with English machine translation. (4 pages).

* cited by examiner

COAL UPGRADE PLANT AND METHOD FOR MANUFACTURING UPGRADED COAL

BACKGROUND OF THE INVENTION

1. Field of the Invention

The present invention relates to a coal upgrade plant and a method for manufacturing upgraded coal.

2. Description of Related Art

Since low ranking coal such as sub-bituminous coal and lignite has a lower carbonization degree and a higher water content than high ranking coal, a calorific value per unit weight is lower. However, since there are abundant deposits of low ranking coal, the low ranking coal is desired to be effectively used. Thus, various coal upgrading techniques have been studied in which the calorific value of the low ranking coal is increased by performing pyrolysis after drying the low ranking coal, and upgraded coal is deactivated so as to prevent spontaneous combustion during transportation or storage (e.g., Japanese Unexamined Patent Application, Publication No. 2014-31462 (hereinafter referred to as JPA 2014-31462)).

In JPA 2014-31462, a carrier gas discharged by a dryer is guided to a combustor, and a combustion gas produced in the combustor is released to the atmosphere through a denitration apparatus, an electric dust collector, and a desulfurization apparatus after heating a pyrolyzer. The denitration apparatus and the desulfurization apparatus used herein require a large amount of water for an absorber or the like. Also, since a plurality of coolers are installed in a coal upgrade plant, a large amount of cooling water is required. As described above, in the coal upgrade plant, it is necessary to supply much water from outside of the plant.

On the other hand, coal contains much moisture. Low ranking coal contains 25 wt % to 60 wt % of moisture. Thus, the carrier gas discharged when the coal is dried contains much vapor, thereby causing a problem that the amount of flue gas is increased as a whole, and a flue gas treatment equipment has a larger size, resulting in an increase in equipment costs.

The present invention has been made in view of such circumstances, and an object thereof is to provide a coal upgrade plant and a method for manufacturing upgraded coal capable of reducing the supply amount of water to be used in the coal upgrade plant as much as possible.

Another object of the present invention is to downsize a flue gas treatment equipment that treats a carrier gas discharged when coal is dried.

BRIEF SUMMARY OF THE INVENTION

To achieve the above objects, a coal upgrade plant and a method for manufacturing upgraded coal of the present invention employ the following solutions.

The present inventors focused on the fact that much steam is generated when coal is dried since the coal (particularly, low ranking coal) contains much moisture, but the steam is not effectively used, and achieved the present invention.

That is, a coal upgrade plant according to one aspect of the present invention includes: a dryer that heats and dries coal before pyrolyzing the coal; a scrubber that treats a carrier gas discharged from the dryer while catching a desorbed component desorbed from the coal when the coal is dried by the dryer; a waste water treatment equipment that treats waste water collected from the scrubber; and a water demanding section that uses recycled water treated in the waste water treatment equipment.

Various desorbed components are generated when the coal is heated and dried by the dryer before pyrolyzing the coal. A main component of the desorbed components is steam. Particularly, when the coal is low ranking coal, a large amount of steam is generated. The desorbed components such as the steam are guided to the scrubber together with the carrier gas, and the desorbed components including the steam are removed from the carrier gas by the scrubber, and introduced into the waste water. The waste water collected from the scrubber is guided to the waste water treatment equipment, and separated into sludge, which is a solid content such as pulverized coal and mercury, and the recycled water. The recycled water obtained as described above is used in the water demanding section. As described above, water can be collected as the recycled water from the steam in the desorbed components generated when the coal is dried, and can be used in the water demanding section. The amount of water newly required in the coal upgrade plant can be thereby cut down, so that water supplied to the coal upgrade plant from outside can be reduced as much as possible.

As the water demanding section, a place where water is used within the coal upgrade plant is indicated. Examples thereof include a flue gas treatment equipment that requires water when a flue gas generated from the plant is treated, and a cooling device that requires water when the flue gas or the coal is cooled.

In the coal upgrade plant according to one aspect of the present invention, the water demanding section is an absorber feed section that is used in the scrubber.

The recycled water is used for the absorber feed section that feeds an absorber used in the scrubber. The amount of circulation water or supply water newly required in the scrubber can be thereby cut down, so that water supplied to the coal upgrade plant from outside can be reduced as much as possible.

The coal upgrade plant according to one aspect of the present invention further includes a carrier gas cooler that is provided on an upstream side of the scrubber to cool the carrier gas discharged from the dryer, wherein the water demanding section is a cooling water feed section that feeds cooling water to the carrier gas cooler.

The carrier gas is cooled by the carrier gas cooler before being guided to the scrubber, and moisture in the carrier gas is condensed to become drain water. The recycled water is used as the cooling water supplied to the carrier gas cooler. The amount of cooling water newly required in the carrier gas cooler can be thereby cut down, so that water supplied to the coal upgrade plant from outside can be reduced as much as possible.

The coal upgrade plant according to one aspect of the present invention further includes: a pyrolyzer that pyrolyzes the dried coal dried by the dryer; and a quencher that cools the pyrolyzed coal pyrolyzed by the pyrolyzer, wherein the quencher includes a water spray section that sprays water on the pyrolyzed coal, and the water demanding section is the water spray section.

The recycled water is used as the water sprayed from the water spray section of the quencher. The amount of water newly required in the quencher can be thereby cut down, so that water supplied to the coal upgrade plant from outside can be reduced as much as possible.

The coal upgrade plant according to one aspect of the present invention further includes: a pyrolyzer that pyrolyzes the dried coal dried by the dryer; a quencher that cools the pyrolyzed coal pyrolyzed by the pyrolyzer; and a finisher that deactivates the pyrolyzed coal cooled by the quencher, wherein the finisher includes a deactivation gas feed section that feeds a treatment gas containing a predetermined concentration of oxygen, and the water demanding section is a water adding section that feeds water to the deactivation gas feed section.

The recycled water is used for the water adding section that adds water to the deactivation gas feed section. The amount of water for humidifying the pyrolyzed coal can be thereby cut down, so that water supplied to the coal upgrade plant from outside can be reduced as much as possible.

The coal upgrade plant according to one aspect of the present invention further includes a flue gas treatment equipment that treats a flue gas treated by the scrubber.

The flue gas treatment equipment that treats the flue gas treated by the scrubber is provided. In the flue gas treatment equipment, a residual substance such as mercury in the flue gas that could not be treated by the scrubber is removed. Accordingly, the flue gas treatment equipment treats the flue gas from which moisture has been removed by the scrubber. Thus, the capacity of the flue gas treatment equipment can be reduced as compared to that of a case in which the flue gas is treated without being treated by the scrubber.

A method for manufacturing upgraded coal according to one aspect of the present invention includes: a drying step of heating and drying coal before pyrolyzing the coal; a treating step with a scrubber of treating, by a scrubber, a carrier gas discharged in the drying step while catching a desorbed component desorbed from the coal when the coal is dried in the drying step; a waste water treating step of treating waste water collected in the treating step with the scrubber; and a water reusing step of using recycled water treated in the waste water treating step.

Various desorbed components are generated when the coal is heated and dried in the drying step before pyrolyzing the coal. A main component of the desorbed components is steam. Particularly, when the coal is low ranking coal, a large amount of steam is generated. The desorbed components such as the steam are guided to the scrubber together with the carrier gas, and the desorbed components including the steam are removed from the carrier gas by the scrubber, and introduced into the waste water. The waste water collected from the scrubber is guided to the waste water treating step, and separated into sludge, which is a solid content such as pulverized coal and mercury, and the recycled water. The recycled water obtained as described above is reused in a coal upgrade plant. As described above, water can be collected as the recycled water from the steam in the desorbed components generated when the coal is dried, and can be reused. The amount of water required in the coal upgrade plant can be thereby cut down, so that water supplied to the coal upgrade plant from outside can be reduced as much as possible.

Since the moisture collected from the coal can be reused, water supplied to the coal upgrade plant from outside can be reduced as much as possible.

Also, since the flue gas treatment equipment is provided downstream of the scrubber, the flue gas treatment equipment can be downsized.

DETAILED DESCRIPTION OF THE INVENTION

In the following, one embodiment according to the present invention is described by reference to the drawings.

Figure 1:
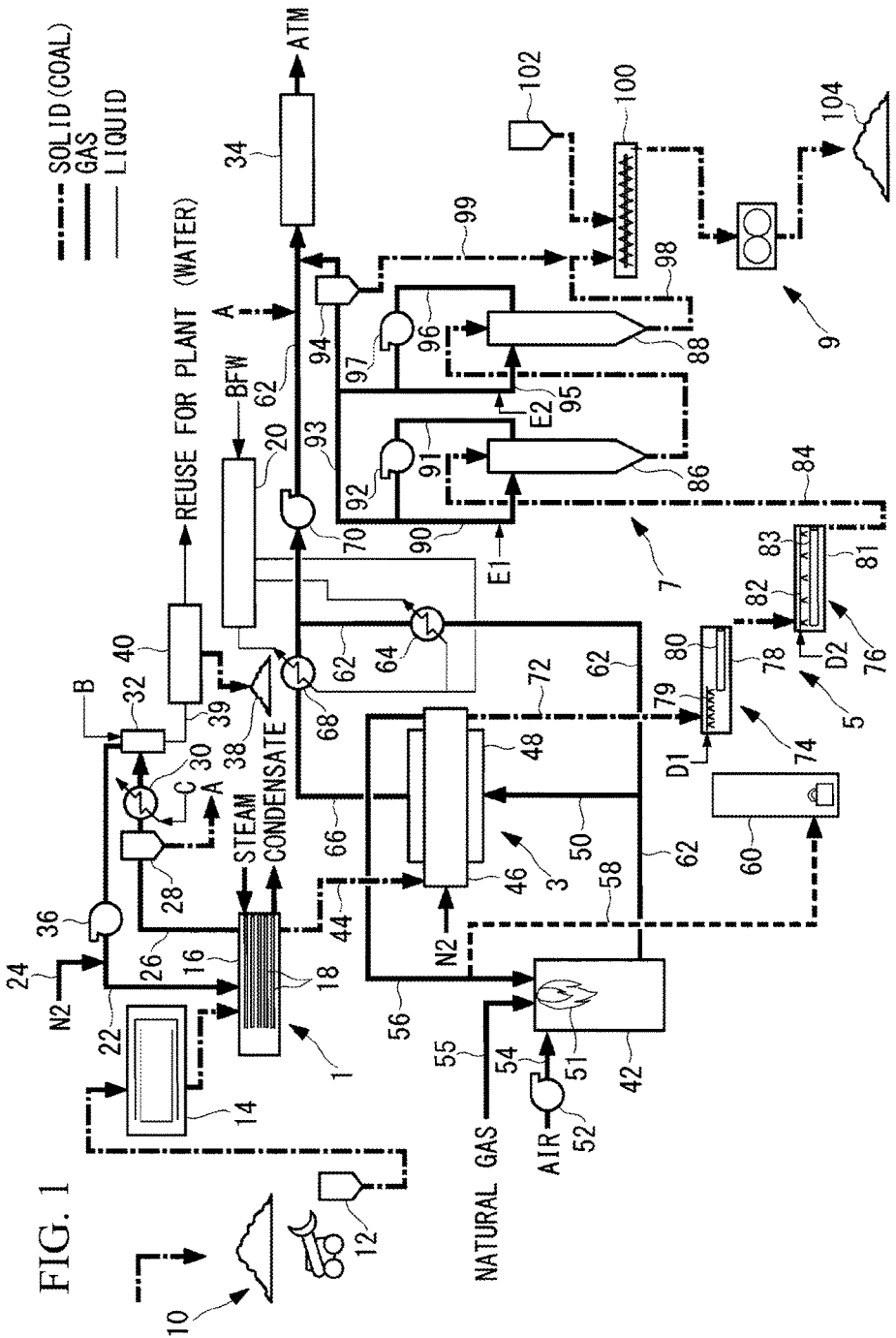
FIG. 1 is a schematic configuration diagram illustrating the entire configuration of a coal upgrade plant including a pyrolyzed coal quencher according to one embodiment of the present invention.

FIG. 1 shows a coal upgrade plant according to one embodiment of the present invention. The coal upgrade plant includes a dryer 1 that heats and dries coal, a pyrolyzer 3 that heats and pyrolyzes the dried coal dried in the dryer 1, a quencher 5 that cools the pyrolyzed coal pyrolyzed in the pyrolyzer 3, a finisher 7 that deactivates the pyrolyzed coal cooled in the quencher 5, and a briquetter 9 that briquettes the upgraded coal deactivated by the finisher 7 into a predetermined shape.

A coal hopper 12 that receives raw coal 10 is provided on the upstream side of the dryer 1. The raw coal is low ranking coal such as sub-bituminous coal and lignite, and has a water content of 25 wt % or more to 60 wt % or less. The coal guided from the coal hopper 12 is crushed to a particle size of, for example, about 20 mm or less in a crusher 14.

The coal crushed in the crusher 14 is guided to the dryer 1. The dryer 1 is of indirect heating type using steam, and includes a cylindrical vessel 16 that rotates about a center axis, and a plurality of heating tubes 18 that are inserted into the cylindrical vessel 16. The coal guided from the crusher 14 is fed into the cylindrical vessel 16. The coal fed into the cylindrical vessel 16 is guided from one end side (the left side in FIG. 1) to the other end side while being agitated according to the rotation of the cylindrical vessel 16. Steam having a temperature of 150° C. or more to 200° C. or less (more specifically, 180° C.), which is produced in a steam system 20, is fed into each of the heating tubes 18, thereby indirectly heating the coal in contact with the outer periphery of each of the heating tubes 18. The steam fed into each of the heating tubes 18 is condensed after applying condensation heat by heating the coal, discharged from the dryer 1, and returned to the steam system 20.

A carrier gas is fed into the cylindrical vessel 16 through a carrier gas circulation path 22. As the carrier gas, an inert gas is used. More specifically, a nitrogen gas is used. When in shortage, the nitrogen gas is additionally fed from a nitrogen feed path 24 that is connected to the carrier gas circulation path 22. The carrier gas is discharged outside of the cylindrical vessel 16 through a carrier gas discharge path 26 that is connected to the cylindrical vessel 16 while catching a desorbed component (steam, pulverized coal, mercury, mercury-based substances, etc.) desorbed from the coal when passing through the cylindrical vessel 16.

A cyclone (dust collector) 28, a carrier gas cooler 30, a scrubber 32, and a flue gas treatment equipment 41 are provided in the carrier gas discharge path 26 sequentially from the upstream side of a carrier gas flow direction.

The cyclone 28 mainly removes the pulverized coal (for example, having a particle size of 100 μm or less) that is a solid from the carrier gas by use of a centrifugal force. The pulverized coal removed in the cyclone 28 is guided to the upstream side of a bag filter 34 as indicated by reference character A. The pulverized coal separated in the cyclone 28 may be also mixed into the dried coal dried in the dryer 1.

The carrier gas cooler 30 cools the carrier gas, from which the pulverized coal has been removed, thereby condensing steam guided together with the carrier gas and removing the condensed steam as drain water. The carrier gas cooler 30 is an indirect heat exchanger. Recycled water separated in a waste water treatment equipment 40 is used as a cooling medium (a cooling water feed section; see reference character C). The drain water produced in the carrier gas cooler 30 is guided to a liquid phase section in a lower portion of the scrubber 32.

The scrubber 32 removes the mercury and/or the mercury-based substances (simply referred to as "mercury etc." below) from the carrier gas, from which the pulverized coal and the steam have been removed. The recycled water separated in the waste water treatment equipment 40 is used as an absorber used in the scrubber 32 (an absorber feed section; see reference character B). The mercury etc. in the carrier gas is adsorbed by the water sprayed from above the scrubber 32, and guided to the liquid phase section in the lower portion of the scrubber 32. In the scrubber 32, the pulverized coal that could not be removed in the cyclone 28 is also removed.

An upstream end of the carrier gas circulation path 22 is connected to an upper portion of the scrubber 32. A blower 36 is provided at an intermediate position of the carrier gas circulation path 22. The carrier gas treated in the scrubber 32 is returned to the dryer 1 by the blower 36. One portion of the carrier gas treated in the scrubber 32 is guided to a flue gas treatment equipment 41.

Figure 2:
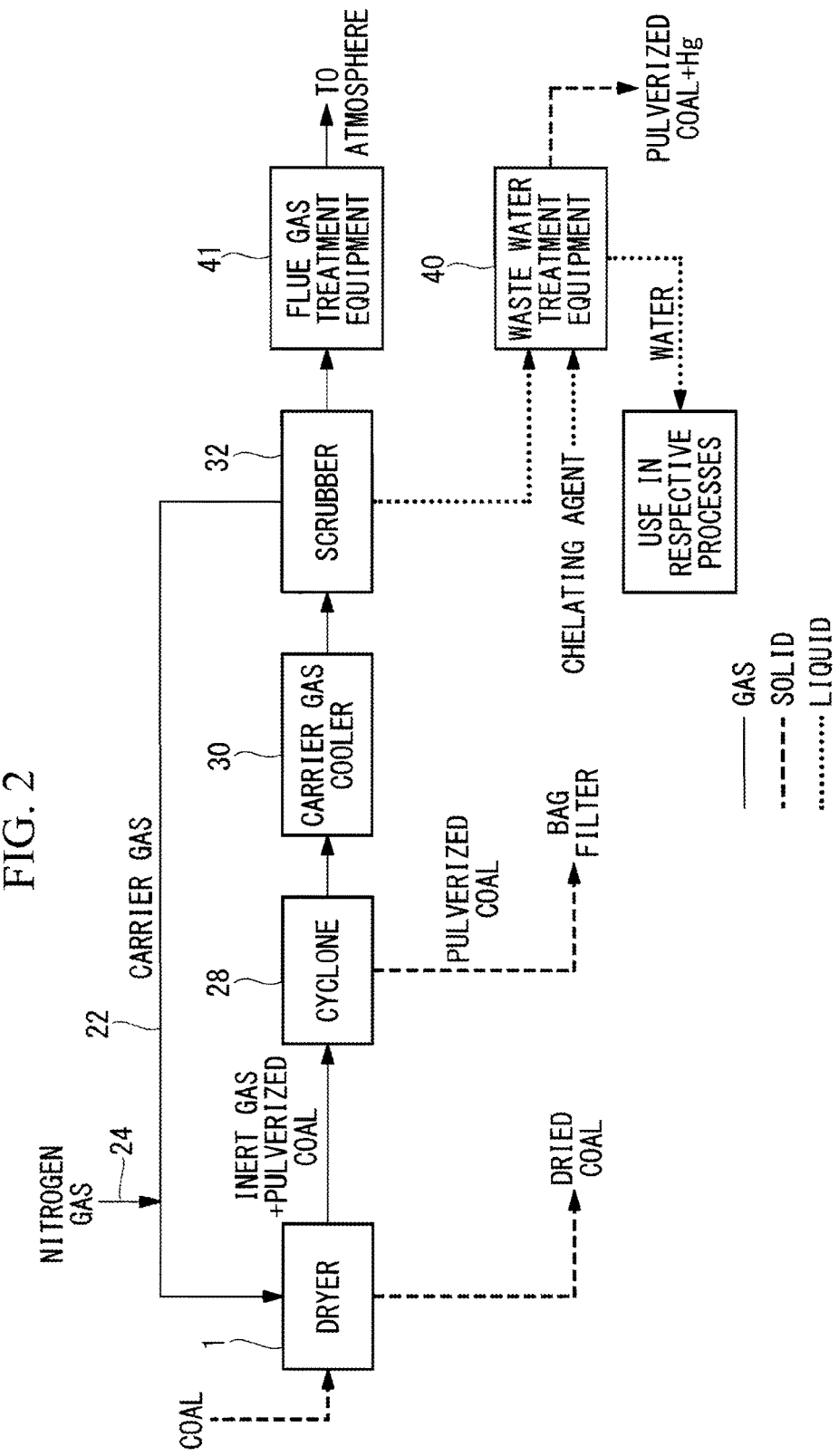
FIG. 2 is a configuration diagram schematically illustrating a drying step shown in FIG. 1.

The waste water treatment equipment 40 is connected to the lower portion of the scrubber 32 through a waste water path 38. As shown in FIG. 2, the waste water treatment equipment 40 separates sludge 39 (see FIG. 1), which is a solid content such as the pulverized coal and the mercury etc., and the recycled water by a sedimentation tank (not shown) after aggregating and enlarging the mercury etc. by injecting a chelating agent into waste water. The recycled water is reused in various processes (water demanding sections) of the plant.

The remaining portion of the carrier gas treated in the scrubber 32 is not returned to the dryer 1 through the carrier gas circulation path 22, and is guided to the flue gas treatment equipment 41. In the flue gas treatment equipment 41, the mercury substances contained in the carrier gas are removed, and the resulting gas after the treatment is released to the atmosphere (ATM). A desulfurization apparatus is used as the flue gas treatment equipment 41.

As shown in FIG. 1, the coal (dried coal) dried in the dryer 1 passes through a dried coal feed path 44 to be guided to the pyrolyzer 3 by use of its weight. The pyrolyzer 3 is an external-heat rotary kiln, and includes a rotating inner cylinder 46, and an outer cylinder 48 that covers the outer peripheral side of the rotating inner cylinder 46. A nitrogen gas as a carrier gas is fed into the rotating inner cylinder 46.

A combustion gas produced in the combustor 42 is guided to a space between the rotating inner cylinder 46 and the outer cylinder 48 through a combustion gas introduction path 50. Accordingly, the inside of the rotating inner cylinder 46 is maintained at 350° C. or more to 450° C. or less (for example, 400° C.)

To the combustor 42, an air feed path 54 that guides combustion air force-fed by a blower 52 into the combustor, a natural gas feed path 55 that guides a natural gas as fuel into the combustor, and a pyrolysis gas collection path 56 that collects a pyrolysis gas generated in the pyrolyzer 3 together with the carrier gas, and guides the gas into the combustor are connected. In the combustor 42, a fire 51 is formed by the natural gas, the pyrolysis gas, and the air fed into the combustor. Since the pyrolysis gas contains a volatile content such as tar and has a predetermined calorific value, the pyrolysis gas is used as fuel in the combustor 42. The natural gas fed from the natural gas feed path 55 is used for adjusting a calorific value of the fuel injected into the combustor 42. A flow rate of the natural gas is adjusted such that the combustion gas produced in the combustor 42 has a desired temperature.

A pyrolysis gas discharge path 58 that is used in emergency is connected to an intermediate position of the pyrolysis gas collection path 56. A flare stack 60 is installed on the downstream side of the pyrolysis gas discharge path 58. A combustible component such as tar in the pyrolysis gas is incinerated by the flare stack 60, and a gas obtained after the incineration is released to the atmosphere.

A combustion gas discharge path 62 through which the combustion gas produced in the combustor is discharged is connected to the combustor 42. An upstream end of the combustion gas introduction path 50 that guides the combustion gas to the pyrolyzer 3 is connected to an intermediate position of the combustion gas discharge path 62. A first medium-pressure boiler 64 is provided in the combustion gas discharge path 62 on the downstream side of a connection position with the combustion gas introduction path 50.

An after-heating gas discharge path 66 through which the combustion gas after heating the rotating inner cylinder 46 is discharged is connected to the outer cylinder 48 of the pyrolyzer 3. A second medium-pressure boiler 68 is provided in the after-heating gas discharge path 66. The after-heating gas discharge path 66 is connected to the combustion gas discharge path 62 on the downstream side. A blower 70 that force-feeds the combustion gas is provided in the combustion gas discharge path 62 on the downstream side of a connection position with the after-heating gas discharge path 66.

The downstream side of the combustion gas discharge path 62 is connected to the bag filter 34. A flue gas, from which combustion ash or the like is removed in the bag filter 34, is released to the atmosphere (ATM).

The steam system 20 includes the first medium-pressure boiler 64 and the second medium-pressure boiler 68. In the second medium-pressure boiler 68, boiler feed water (BFW) fed thereto is heated by the combustion gas flowing through the after-heating gas discharge path 66, thereby producing steam. In the first medium-pressure boiler 64, the steam produced in the second medium-pressure boiler 68 is guided, and heated by the flue gas flowing through the combustion gas discharge path 62, thereby producing steam having a higher pressure. Medium-pressure steam produced in the first medium-pressure boiler 64 and medium-pressure steam produced in the second medium-pressure boiler 68 are respectively stored in a steam drum (not shown), and fed to various portions of the plant such as the heating tubes 18 of the dryer 1.

The pyrolyzed coal pyrolyzed in the pyrolyzer 3 is guided to the quencher 5 through a pyrolyzed coal feed path 72 by use of gravity. The quencher 5 includes a first cooler 74 that receives the pyrolyzed coal from the pyrolyzer 3, and a second cooler 76 that receives the pyrolyzed coal cooled by the first cooler 74.

The first cooler 74 is a shell-and-tube heat exchanger, and includes a first cylindrical vessel 78 that rotates about a center axis, a first water spray tube 79 that is inserted into the first cylindrical vessel 78, and a plurality of first cooling tubes 80 that are inserted into the first cylindrical vessel 78. The first water spray tube 79 is installed in a stationary state with respect to the rotating first cylindrical vessel 78. The pyrolyzed coal having a temperature of 300° C. or more to 500° C. or less (for example, about 400° C.), which is guided from the pyrolyzer 3, is fed into the first cylindrical vessel 78. The pyrolyzed coal fed into the first cylindrical vessel 78 is guided from one end side (the left side in FIG. 1) to the other end side while being agitated according to the rotation of the first cylindrical vessel 78.

The recycled water having a normal temperature separated in the waste water treatment equipment 40 is guided to the first water spray tube 79 (a water spray section; see reference character D1). The water is sprayed on the pyrolyzed coal and thereby brought into direct contact with the pyrolyzed coal to cool down the pyrolyzed coal. The first water spray tube 79 is provided on the upstream side (the left side in FIG. 1) of the pyrolyzed coal moving within the first cylindrical vessel 78.

Boiler feed water having a temperature of 50° C. or more to 100° C. or less (for example, about 60° C.) is fed into each of the first cooling tubes 80, thereby indirectly cooling the pyrolyzed coal in contact with the outer periphery of each of the first cooling tubes 80. Each of the first cooling tubes 80 is provided on the downstream side (the right side in FIG. 1) of the pyrolyzed coal moving within the first cylindrical vessel 78. Each of the first cooling tubes 80 cools the pyrolyzed coal cooled by the first water spray tube 79 to about 150° C. that is equal to or higher than a condensation temperature of water.

The second cooler 76 has substantially the same configuration as the first cooler 74. The second cooler 76 is a shell-and-tube heat exchanger, and includes a second cylindrical vessel 81 that rotates about a center axis, a second water spray tube 82 that is inserted into the second cylindrical vessel 81, and a plurality of second cooling tubes 83 that are inserted into the second cylindrical vessel 81. The second water spray tube 82 is installed in a stationary state with respect to the rotating second cylindrical vessel 81. The pyrolyzed coal cooled to about 150° C. in the first cooler 74 is fed into the second cylindrical vessel 81. The pyrolyzed coal fed into the second cylindrical vessel 81 is guided from one end side (the left side in FIG. 1) to the other end side while being agitated according to the rotation of the second cylindrical vessel 81.

The recycled water having a normal temperature separated in the waste water treatment equipment 40 is guided to the second water spray tube 82 (a water spray section; see reference character D2). The water is sprayed on the pyrolyzed coal to adjust the water content of the pyrolyzed coal to a desired value (for example, 8 wt %). The second water spray tube 82 is provided over substantially the entire second cylindrical vessel 81 in an axial direction.

Industrial water having a normal temperature is guided into each of the second cooling tubes 83, thereby indirectly cooling the pyrolyzed coal in contact with the outer periphery of each of the second cooling tubes 83. Each of the second cooling tubes 83 cools the pyrolyzed coal to about 50° C. The recycled water separated in the waste water treatment equipment 40 may be used as the water fed to each of the second cooling tubes 83.

The pyrolyzed coal cooled in the quencher 5 is guided to the finisher 7 through a cooled pyrolyzed coal feed path 84.

The finisher 7 includes a first deactivator 86 that receives the pyrolyzed coal cooled in the quencher 5, and a second deactivator 88 that receives the pyrolyzed coal from the first deactivator 86.

An oxidation gas having an oxygen concentration of about 0.5 to 3.0% is guided into the first deactivator 86 from a first oxidation gas feed path (deactivation gas feed section) 90. The recycled water separated in the waste water treatment equipment 40 is added to the first oxidation gas feed path 90 (a water adding section; see reference character E1).

By adding water as described above, the pyrolyzed coal is humidified, and the water content of the pyrolyzed coal is thereby adjusted. Although not shown in the drawings, oxygen (more specifically, air) is fed to the first oxidation gas feed path 90 so as to adjust the oxygen concentration to a desired value.

The oxidation gas fed into the first deactivator 86 oxidizes an active spot (radical) generated by the pyrolysis to deactivate the pyrolyzed coal within the first deactivator 86. The oxidation gas discharged from the first deactivator 86 is guided to a first blower 92 through a first oxidation gas outlet tube 91 together with the pulverized coal. The oxidation gas force-fed by the first blower 92 is guided to the first oxidation gas feed path 90 again, and recirculated. The oxidation gas guided not to the first oxidation gas feed path 90, but to an oxidation gas discharge tube 93 is guided to a cyclone 94. The solid content such as the pulverized coal is separated from the oxidation gas guided to the cyclone 94 in the cyclone 94, and the resultant gas is guided to the bag filter 34 and released to the atmosphere (ATM). The solid content such as the pulverized coal separated in the cyclone 94 is fed to a kneader 100.

The pyrolyzed coal is injected from an upper portion of the first deactivator 86, and deactivated in contact with the oxidation gas while descending. The pyrolyzed coal retained in a lower portion of the first deactivator 86 is taken out from the lower portion, and guided to an upper portion of the second deactivator 88.

An oxidation gas having an oxygen concentration of about 8.0 to 12.0% is guided into the second deactivator 88 from a second oxidation gas feed path (deactivation gas feed section) 95. The recycled water separated in the waste water treatment equipment 40 is added to the second oxidation gas feed path 95 (a water adding section; see reference character E2). By adding water as described above, the pyrolyzed coal is humidified, and the water content of the pyrolyzed coal is thereby adjusted. Although not shown in the drawings, oxygen (more specifically, air) is fed to the second oxidation gas feed path 95 so as to adjust the oxygen concentration to a desired value.

The oxidation gas fed into the second deactivator 88 further deactivates the pyrolyzed coal deactivated in the first deactivator 86. The oxidation gas discharged from the second deactivator 88 is guided to a second blower 97 through a second oxidation gas outlet tube 96 together with the pulverized coal. The oxidation gas force-fed by the second blower 97 is guided to the second oxidation gas feed path 95 again, and recirculated. The oxidation gas guided not to the second oxidation gas feed path 95, but to the oxidation gas discharge tube 93 is guided to the cyclone 94. The solid content such as the pulverized coal is separated from the oxidation gas, and the resultant gas is guided to the bag filter 34 and released to the atmosphere.

The upgraded coal deactivated in the finisher 7 has a particle size of about 1 mm. The upgraded coal passes through an upgraded coal feed path 98 to be guided to the kneader 100. The pulverized coal separated in the cyclone 94 is guided to the upgraded coal feed path 98 through a pulverized coal collection path 99.

A binder guided from a binder feed section 102, the upgraded coal including the pulverized coal, and water are fed to and kneaded in the kneader 100. Examples of the binder include polyethylene oxide and starch. The upgraded coal kneaded in the kneader 100 is guided to the briquetter 9.

The briquetter 9 includes a female mold where a plurality of recessed portions having a shape corresponding to the product shape of the upgraded coal are formed, and a male mold that compresses the upgraded coal fed into the recessed portions by pressing. The upgraded coal briquetted in the briquetter 9 becomes upgraded coal 104 as a product. The upgraded coal 104 has a size of about several cm, and has a water content of 6 wt % or more to 9 wt % or less. Note that the water content of the upgraded coal 104 is based on a dry weight when the water content is in equilibrium with a storage environment, and the water content largely depends on relative humidity of the storage environment, but does not much depend on the temperature. For example, PRB (powder river basin) coal has a water content of about 8 wt % when the relative humidity is 90%.

As described above, the following effects are produced by the present embodiment.

The present inventors focused on the fact that when coal such as low ranking coal contains much moisture, much steam is generated by drying the coal, but the steam is not effectively used. Thus, water is collected as the recycled water in the waste water treatment equipment 40 from the steam in the desorbed component generated when the coal is dried in the dryer 1, and is used in the water demanding sections B, C, D1, D2, E1, and E2 that require water in the coal upgrade plant. The amount of water newly required in the coal upgrade plant can be thereby cut down, so that water supplied to the coal upgrade plant can be reduced as much as possible.

To be more specific, the recycled water is used as the absorber used in the scrubber 32 (see the reference character B in FIG. 1). The amount of circulation water or supply water newly required in the scrubber 32 can be thereby cut down.

The recycled water is also used as the cooling water supplied to the carrier gas cooler 30 (see the reference character C in FIG. 1). The amount of cooling water newly required in the carrier gas cooler 30 can be thereby cut down.

The recycled water is also used as the water sprayed from the water spray sections 79 and 82 of the quencher 5 (see the reference characters D1 and D2 in FIG. 1). The amount of water newly required in the quencher 5 can be thereby cut down.

The recycled water is also used as the water added to the oxidation gas feed paths 90 and 95 (see the reference characters E1 and E2 in FIG. 1). The amount of water newly required for humidifying the pyrolyzed coal can be thereby cut down.

The flue gas treatment equipment 41 that treats the flue gas treated by the scrubber 32 is provided. Accordingly, the flue gas treatment equipment 41 treats the flue gas from which the moisture has been removed by the scrubber 32. Thus, the capacity of the flue gas treatment equipment 41 can be reduced as compared to that of a case in which the flue gas is treated without being treated by the scrubber 32.

Although the reference characters B, C, D1, D2, E1, and E2 are specifically indicated and described as the water demanding sections that are the use destination of the recycled water collected in the waste water treatment equipment 40 in the aforementioned embodiment, the present invention is not limited thereto. Any one of the positions indicated by the respective reference characters may be employed, or two or more of the positions may be also employed. Moreover, a position requiring water in the coal upgrade plant, such as a washing scrubber, a wet desulfurization apparatus, and a cooler (not shown), may be employed as the water demanding section of the present invention.

1 Dryer
3 Pyrolyzer
5 Quencher
7 Finisher
9 Briquetter
10 Raw coal
12 Coal hopper
14 Crusher
16 Cylindrical vessel
18 Heating tube
20 Steam system
22 Carrier gas circulation path
28 Cyclone
30 Carrier gas cooler
32 Scrubber
34 Bag filter
40 Waste water treatment equipment
41 Flue gas treatment equipment
42 Combustor
46 Rotating inner cylinder
48 Outer cylinder
50 Combustion gas introduction path
74 First cooler
76 Second cooler
78 First cylindrical vessel
79 First water spray tube
80 First cooling tube
81 Second cylindrical vessel
82 Second water spray tube
83 Second cooling tube
86 First deactivator
88 Second deactivator
90 First oxidation gas feed path
91 First oxidation gas outlet tube
92 First blower
93 Oxidation gas discharge tube
94 Cyclone
95 Second oxidation gas feed path
96 Second oxidation gas outlet tube
97 Second blower
100 Kneader
104 Upgraded coal

What is claimed is:

1. A coal upgrade plant comprising:
   a dryer for heating and drying coal before pyrolyzing the coal;
   a scrubber for treating a carrier gas discharged from the dryer while catching a desorbed component desorbed from the coal when the coal is dried by the dryer, and causing at least one of mercury and mercury-based substances contained in the carrier gas to be adsorbed to an absorber for removal thereof;
   a waste water treatment equipment for separating waste water collected from the scrubber into a solid content and recycled water;
   a water demanding section for using the recycled water treated in the waste water treatment equipment; and
   a carrier gas cooler that is provided on an upstream side of the scrubber to cool the carrier gas discharged from the dryer by using cooling water,
   wherein the water demanding section is a cooling water feed section that feeds the cooling water to the carrier gas cooler, and uses the recycled water as the cooling water.

2. The coal upgrade plant according to claim 1, wherein the water demanding section is an absorber feed section that is used in the scrubber.

3. The coal upgrade plant according to claim 1, further comprising:
   a pyrolyzer for pyrolyzing the dried coal dried by the dryer; and
   a quencher for cooling the pyrolyzed coal pyrolyzed by the pyrolyzer,
   wherein the quencher includes a water spray section that sprays water on the pyrolyzed coal, and
   the water demanding section is the water spray section.

4. The coal upgrade plant according to claim 1, further comprising:
   a pyrolyzer for pyrolyzing the dried coal dried by the dryer;
   a quencher for cooling the pyrolyzed coal pyrolyzed by the pyrolyzer; and
   a finisher for deactivating the pyrolyzed coal cooled by the quencher,
   wherein the finisher includes a deactivation gas feed section for feeding a treatment gas containing a predetermined concentration of oxygen, and
   the water demanding section is a water adding section that feeds water to the deactivation gas feed section.

5. The coal upgrade plant according to claim 1, further comprising a flue gas treatment equipment for treating a flue gas treated by the scrubber.

6. A method for manufacturing upgraded coal comprising:
   a drying step of heating and drying coal before pyrolyzing the coal;
   a treating step with a scrubber of treating, by a scrubber, a carrier gas discharged in the drying step while catching a desorbed component desorbed from the coal when the coal is dried in the drying step, and causing at least one of mercury and mercury-based substances contained in the carrier gas to be adsorbed to an absorber for removal thereof;
   a waste water treating step of separating waste water collected in the treating step with the scrubber into a solid content and recycled water;
   a water reusing step of using recycled water treated in the waste water treating step; and
   a cooling step of cooling the carrier gas discharged in the drying step before the carrier gas is treated with the scrubber in the treating step by using cooling water,
   wherein the recycled water in the water reusing step is used for cooling the carrier gas in the cooling step, and the recycled water is used as the cooling water.

* * * * *